Patented July 4, 1933

1,916,776

UNITED STATES PATENT OFFICE

ADOLF STEINDORFF, KARL DAIMLER, AND KARL PLATZ, OF FRANKFORT-ON-THE-MAIN-HOCHST, GERMANY, ASSIGNORS TO I G. FARBENINDUSTRIE AKTIENGESELL-SCHAFT, OF FRANKFORT-ON-THE-MAIN, GERMANY

SULPHONATED FATTY ACID ESTERS AND THEIR PRODUCTION

No Drawing. Application filed February 17, 1931, Serial No. 516,514, and in Germany February 25, 1930.

The present invention relates to ester-like wetting-agents, foaming agents and dispersing agents and a process of preparing them.

We have found that hydroxylated or halogenated derivatives of aliphatic, cyclo-aliphatic, aromatic or hydroaromatic sulphonic acids of the following general formula:

$$HO_3S-R-X$$

wherein X stands for OH or a halogen atom and R stands for an isocyclic ring system or for one of the groups

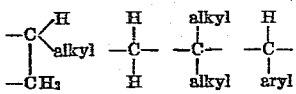

can be caused to react with the higher fatty acids, the derivatives or salts thereof. The products obtained have properties which are remarkably favorable soap-like, particularly wetting and emulsifying properties.

These reactions or esterifications may be produced by causing a halogenated sulphonic acid, for instance chloromethane-sulphonic acid, a bromopropane-sulphonic acid, a chlorobutane-sulphonic acid, a chloronaphthalene-sulphonic acid, a chlorophenol-sulphonic acid or a salt of any of them to react with a salt of a higher fatty acid. Another method consists in causing a hydroxylated aliphatic sulphonic acid, for instance a hydroxypropane-sulphonic acid or a hydroxybutane-sulphonic acid, an aliphatic aldehyde- or ketone-bisulphite compound (which may likewise be regarded as a hydroxy-sulphonic acid) or a hydroxylated aromatic sulphonic acid, such as a phenolsulphonic acid, a cresol sulphonic acid or a naphthol sulphonic acid, or an aromatic aldehyde- or ketone-bisulphite compound, or a hydroaromatic sulphonic acid, such as cyclohexanol sulphonic acid, to esterify according to known methods with higher fatty acids.

These esters of the general formula $$R_1.COO.R.SO_3Na$$

wherein $R_1$ stands for the alkyl radicle of a fatty acid and R stands for an isocyclic ring system or for one of the groups

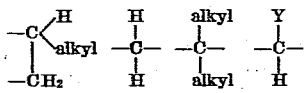

wherein Y stands for benzene or a naphthalene nucleus having a great wetting power; they are capable of dissolving lime soaps and show an excellent washing effect. Their calcium-salts are soluble in hot water, for the most part also in cold water. Some of the esters have a remarkable stability to dilute alkalies and acids, wherein they have a great foaming and wetting action. Due to these properties it is possible to use these products with great advantage in the textile and leather industries.

The following examples serve to illustrate our invention, but they are not intended to limit it thereto, the parts being by weight:

(1.) 180 parts of sodium 1.2-hydroxy-butane-sulphonate and 300 parts of stearyl chloride are heated together in the course of 4 hours at a temperature between 100° C. and 120° C., while stirring. Stirring is continued at this temperature until the hydrochloric acid which separates is removed. The product is soluble in water and stable to dilute alkalies and acids. In order to obtain the product in a pure condition, it is recrystallized from ethyl alcohol. The product obtained has the following formula:

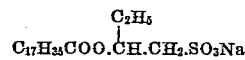

(2.) 150 parts of sodium chloromethane-sulphonate are heated with 300 parts of sodium oleate for several hours at 200° C., while stirring, until a test sample of the product dissolved in hot water no longer shows any turbidity when acidified with dilute hydrochloric acid. In order to obtain the product in a pure condition, it is recrystallized from ethyl chloride. The product obtained has the following formula:

$$C_{17}H_{33}COO.CH_2.SO_3Na$$

(3.) 150 parts of dry formaldehyde bisulphite (of 90 per cent. strength) are introduced into 300 parts of oleic acid chloride; the temperature is raised in the course of 10 hours to 50° C.–60° C., while stirring. Care has to be taken, that the hydrochloric acid which is produced is quickly removed from the reaction vessel, for instance by working in a vacuum. The end of the reaction is determined as described in Example 2. If necessary, stirring may be continued for several hours while adding 5–10 parts of formaldehyde bisulphite. The product is purified as described in Example 2 and has the following formula:

$$C_{17}H_{33}COO.CH_2.SO_3H$$

(4.) 170 parts of sodium 1.2-hydroxypropane-sulphonate (prepared from propylene oxide) are treated with 270 parts of palmitinic acid chloride under the conditions of reaction indicated in Example 1. The product is neutralized by kneading it with calcined caustic soda solution; it may then be used without being purified. It has the following formula:

$$C_{15}H_{31}COO.\overset{\overset{\displaystyle CH_3}{|}}{CH}.CH_2.SO_3Na$$

(5.) 170 parts of potassium 1.3-dihydroxypropane-sulphonate are caused to react with 300 parts of oleic acid chloride. The product is purified as described in Example 1; it has the following formula:

$$C_{17}H_{33}COO.CH_2.\overset{\overset{\displaystyle SO_3Na}{|}}{CH}.CH_2.OH$$

(6.) 320 parts of sodium ricinoleate are heated to 180° C.–200° C. As soon as the mass has become liquid, 280 parts of dry, finely pulverized sodium benzyl chloride sulphonate are introduced in the course of half an hour, while vigorously stirring. Stirring is continued until the product has become soluble in water and stable to acids. The product is also insensitive to hot, dilute mineral acid. It has the following formula:

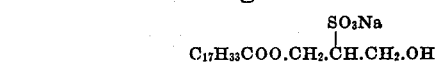

$$C_{17}H_{32}OH.COO.CH_2-\langle\ \rangle-SO_3Na$$

(7.) 200 parts of finely pulverized sodium para-phenol-sulphonate are introduced into 300 parts of oleic acid chloride, while vigorously stirring. The temperature is raised in the course of 4 hours to 120° C. and then for a short time to 160° C. The product is soluble in water and rather stable to acids. It has the following formula:

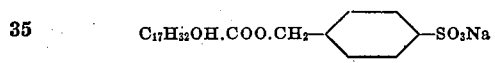

$$C_{17}H_{33}COO-\langle\ \rangle-SO_3Na$$

(8.) 270 grams of finely pulverized sodium-2-naphthol-6-sulphonate (Schäffer's salt) are introduced into 300 grams of oleic acid chloride, while vigorously stirring. The temperature is maintained at 40° C. As soon as the evolution of hydrochloric acid has diminished, the temperature is raised to 100° C. and finally to 140° C.–160° C. In order to obtain the product in a pure condition it is recrystallized from water. It has the following formula:

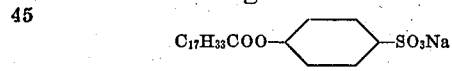

(9.) 270 parts of resorcinol disulphonic acid are introduced into 600 parts of oleic acid chloride, while vigorously stirring, and the temperature is raised in the course of 6 hours to 100° C.–120° C. The reaction is complete when a test sample dissolves in water to a clear solution. In order to obtain the product in a pure condition, it is recrystallized in benzene. It has the following formula:

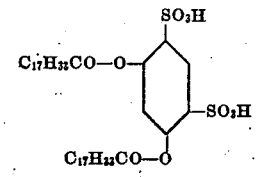

(10.) 330 parts of the acid chloride of an acid of bleached lignite wax are treated with 180 parts of sodium 1.2-hydroxy-butane-sulphonate as described in Example 9. The product is a fatty powder.

(11.) 260 parts of naphthenic acid chloride and 200 parts of potassium 1.3-hydroxy-butane-sulphonate are treated as described in Example 9.

(12.) 300 parts of an acetone bisulphite compound and 300 parts of oleic acid chloride are stirred together in a cylinder, wherein a vacuum is produced, for 4 hours at a temperature between 40° C. and 80° C. Stirring is continued for about 4 hours at 80° C.–110° C. and the product is separated from the precipitated sodium chloride by recrystallizing it from alcohol. It has the following formula:

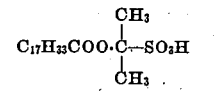

(13.) 230 parts of a benzaldehyde bisulphite compound are kneaded with 300 parts of stearyl chloride in an enamelled washing and kneading machine for 4 hours at a temperature between 40° C. and 80° C., while excluding moisture. As soon as the reaction is complete, the product is worked up as described in Example 12. The product has the following formula:

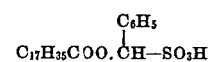

$$C_{17}H_{35}COO.\overset{\overset{\displaystyle C_6H_5}{|}}{CH}-SO_3H$$

(14.) 105 parts of sodium cyclohexanol-sulphonate are gradually introduced in the course of 1 hour into 150 parts of oleic acid chloride at a temperature of between 80° C.–100° C. The product is stirred until it is soluble in water to a clear solution. If necessary, it is purified by recrystallizing it from ethyl alcohol.

(15.) 268 parts of sodium cresoxy-β-hydroxy-propane-sulphonate are introduced at a temperature between 90° C. and 100° C. into 280 parts of oleic acid chloride, while stirring. The mixture is then further heated for 1 hour at the temperature mentioned above. After the mass has been allowed to cool, it is neutralized by kneading it with caustic soda solution and then made into a paste by the addition of water. The product has the following formula:

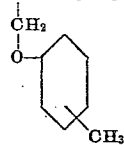

We claim:

1. The process which comprises causing a compound of the general formula:

$$HO_3S-R-X$$

wherein X stands for OH or a halogen atom and R stands for an isocyclic ring system or for one of the groups

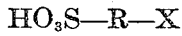

wherein Y stands for benzene or a naphthalene nucleus to react with a fatty acid compound of the general formula:

$$R_1.CO.Z$$

wherein Z stands for OH, O.alkali metal, O.alkyl or a halogen atom and $R_1$ represents the alkyl radicle of a fatty acid, the molecule of which contains more than 3 carbon atoms.

2. The process which comprises causing a compound of the general formula:

$$HO_3S-R-X$$

wherein X stands for OH or a halogen atom and R stands for a benzene or a naphthalene nucleus which may contain sulfo or alkyl groups or for one of the groups

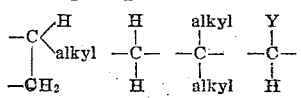

wherein Y stands for benzene or a naphthalene nucleus to react with a fatty acid compound of the general formula:

$$R_1.CO.Z$$

wherein Z stands for OH, O.alkali metal, O.alkyl or a halogen atom and $R_1$ represents the alkyl radicle of a fatty acid, the molecule of which contains more than 3 carbon atoms.

3. The process which comprises causing a compound of the general formula:

to react with a fatty acid compound of the general formula:

$$R_1.CO.Z$$

wherein Z stands for OH, O.alkali metal, O.alkyl or a halogen atom and $R_1$ represents the alkyl radicle of a fatty acid, the molecule of which contains more than 3 carbon atoms.

4. The process which comprises causing 1.2-hydroxybutane sulphonate to react with stearyl chloride.

5. The process which comprises causing 1.2-hydroxypropane sulphonate to react with palmitinic acid chloride.

6. As new products, compounds of the general formula:

$$R_1.COO.R.SO_3Na$$

wherein $R_1$ stands for the alkyl radicle of a fatty acid and R stands for an isocyclic ring system or for one of the groups

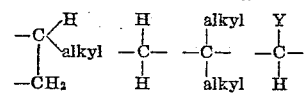

wherein Y stands for benzene or a naphthalene nucleus having a great wetting power, being capable of dissolving lime soaps and showing an excellent washing effect.

7. As new products, compounds of the general formula:

$$R_1-COO.R.SO_3Na$$

wherein $R_1$ stands for the alkyl radicle of a fatty acid and R stands for one of the groups

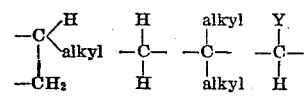

wherein Y stands for benzene or a naphthalene nucleus having a great wetting power, being capable of dissolving lime soaps and showing an excellent washing effect.

8. As new products, compounds of the general formula:

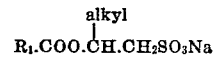

wherein $R_1$ stands for $C_{15}H_{31}$ or $C_{17}H_{33}$ having a great wetting power, being capable of dissolving lime soaps and showing an excellent washing effect.

9. As a new product, a compound of the formula:

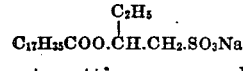

having a great wetting power, being capable of dissolving lime soaps and showing an excellent washing effect.

10. As a new product, a compound of the formula:

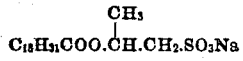

having a great wetting power, being capable of dissolving lime soaps and showing an excellent washing effect.

In testimony whereof, we affix our signatures.

ADOLF STEINDORFF.
KARL DAIMLER.
KARL PLATZ.